United States Patent [19]

Yamamoto et al.

[11] Patent Number: 5,250,627
[45] Date of Patent: Oct. 5, 1993

[54] RUBBER COMPOSITION

[75] Inventors: Keisaku Yamamoto; Hideaki Yamada, both of Ichihara; Masahiro Fukuyama, Sodegaura; Noriyasu Yasuda, Ichihara, all of Japan

[73] Assignee: Sumitomo Chemical Company, Limited, Osaka, Japan

[21] Appl. No.: 831,449

[22] Filed: Feb. 5, 1992

[30] Foreign Application Priority Data

Mar. 8, 1991 [JP] Japan .................. 3-043409

[51] Int. Cl.$^5$ .................. C08L 23/26; C08L 9/02; C08L 23/08
[52] U.S. Cl. .................. 525/194; 525/192; 525/208; 525/221; 525/230
[58] Field of Search .................. 525/230, 193, 194

[56] References Cited

U.S. PATENT DOCUMENTS

| | | | |
|---|---|---|---|
| 3,873,494 | 3/1975 | Lewis | 525/185 |
| 4,591,615 | 5/1986 | Aldred et al. | 525/230 |
| 4,654,402 | 3/1987 | Patel | 525/193 |
| 4,696,967 | 9/1987 | Shedd et al. | 525/193 |
| 4,774,295 | 9/1988 | Buding et al. | 525/333 |
| 4,820,774 | 4/1989 | Takao et al. | 525/208 |
| 5,053,450 | 10/1991 | Coran | 525/230 |

FOREIGN PATENT DOCUMENTS

| | | |
|---|---|---|
| 0268851 | 6/1988 | European Pat. Off. |
| 424348 | 4/1991 | European Pat. Off. |
| 0424348 | 4/1991 | European Pat. Off. |
| 2228798 | 12/1974 | France |
| 2-3438 | 1/1990 | Japan |
| 2163170 | 2/1986 | United Kingdom |

*Primary Examiner*—Carman J. Seccuro, Jr.
*Attorney, Agent, or Firm*—Cushman, Darby & Cushman

[57] ABSTRACT

The present invention provides a rubber composition which comprises the following components (A) and (B):

(A) an ethylene copolymer rubber comprising ethylene and at least one compound selected from the group consisting of acrylic esters and methacrylic esters as constituting units, and (B) a hydrogenated unsaturated nitrile-conjugated diene copolymer rubber.

This composition is well balanced in its properties such as strength characteristics, oil resistance, low-temperature resistance and ozone resistance.

16 Claims, No Drawings

RUBBER COMPOSITION

FIELD OF THE INVENTION

The present invention relates to a rubber composition. More particularly, it relates to a rubber composition which comprises (A) an ethylene copolymer rubber containing at least one compound selected from the group consisting of acrylic esters and methacrylic esters and ethylene as constituting units and (B) a hydrogenated unsaturated nitrile-conjugated diene copolymer rubber. Vulcanized rubber compositions obtained by vulcanization of the rubber compositions of the present invention are excellent in balancing in low-temperature resistance, oil resistance, heat resistance, ozone resistance, and strength properties and hence, they can be widely used in the fields in which these characteristics are utilized. Some examples are various sealing materials such as gaskets, O-rings, packings and oil seals, various hoses, belts and rolls.

BACKGROUND OF THE INVENTION

Recently, various apparatuses used in various industrial fields such as automobiles, appliances and machines have been required to have high performances and functions and have been used under increasingly severe conditions. This tendency is especially conspicuous in automobile industries which are largest users for rubbers. For example, the atmosphere in engine rooms tends to be higher in temperature owing to countermeasures against regulation of off-gas or improvement of engines aiming at enhancement of performance such as increase of power output, and rubbers to be employed for such uses are required to be excellent not only in heat resistance, ozone resistance and oil resistance, but also in flexibility at low temperatures, namely, to be well balanced in properties.

Ethylene copolymer rubbers comprising ethylene and at least one membered selected from the group consisting of acrylic esters and methacrylic esters as constituting units are excellent in heat resistance, low-temperature resistance and strength characteristics, but are inferior in oil resistance. In order to solve this problem, an attempt has been made to increase contents of acrylic esters and/or methacrylic esters. However, this method has the problems that molecular weight of ethylene copolymer rubbers decreases and elasticity, which is a characteristic of rubbers, is not sufficiently exhibited and besides, improvement of oil resistance is also insufficient. That is, there have not yet been found rubbers or rubber compositions which are well balanced in properties such as strength characteristics, oil resistance, low-temperature resistance, heat resistance and ozone resistance with maintaining the characteristics of rubbers.

SUMMARY OF THE INVENTION

The present invention provides a rubber composition which comprises the following components (A) and (B):

Component (A) an ethylene copolymer rubber containing ethylene and at least one selected from the group consisting of acrylic esters and methacrylic esters as constituting units, and Component (B): a hydrogenated unsaturated nitrile-conjugated diene copolymer rubber.

The rubber composition of the present invention can be used finally as a vulcanized rubber composition by vulcanization thereof.

Accordingly, the present invention provides a composition from which a vulcanized rubber composition can be prepared, which vulcanized rubber composition is well balanced in such properties as strength characteristics, oil resistance, low-temperature resistance, heat resistance and ozone resistance while retaining the desirable properties characteristic of rubbers.

The present invention will be explained in detail.

DETAILED DESCRIPTION OF THE INVENTION

Component (A) of the present invention is an ethylene copolymer rubber containing ethylene and at least one membered selected from the group consisting of acrylic esters and methacrylic esters as constituting units.

The acrylic esters and methacrylic esters used here are usually esters comprising alcohols of 1-8 carbon atoms. Examples of these esters are methyl acrylate, methyl methacrylate, ethyl acrylate, ethyl methacrylate, n-butyl acrylate, n-butyl methacrylate, tert-butyl acrylate, tert-butyl methacrylate, 2-ethylhexyl acrylate, and 2-ethylhexyl methacrylate. These may be used singly or in combination of two or more.

Molar ratio of at least one compound selected from the group consisting of acrylic esters and methacrylic esters (hereinafter sometimes reference to as "(meth)acrylic esters") and ethylene is usually (50-15):(50-85), preferably (42-20):(58-80). If the proportion of the (meth)acrylic ester is too high, embrittlement point of the copolymer is high and it sometimes becomes difficult to use the copolymer as a rubber having elasticity at low temperatures. On the other hand, if the proportion is too low, crystallinity of the copolymer increases and sufficient elasticity may not be obtained.

The ethylene copolymer rubber (A) of the present invention can contain a cross-linkable third component in addition to ethylene and (meth) acrylic esters as constituting units. The cross-linkable third component includes, for example, epoxy group-containing monomers and carboxyl group-containing monomers.

The epoxy group-containing monomers include, for example, unsaturated glycidyl esters such as glycidyl acrylate, glycidyl methacrylate, diglycidyl itaconate, triglycidyl butenetricarboxylate, and glycidyl p-styrenecaboxylate.

The carboxyl group-containing monomers include, for example, half ester compounds of acrylic acid, methacrylic acid and maleic acid and unsaturated acid anhydrides such as maleic anhydride.

Content of the crosslinkable third component in the ethylene copolymer rubber (A) is usually 0.05-5 mol %, preferably 0.1-3 mol % based on the total amount of ethylene and (meth)acrylic ester. If the content of the third component is too high, scorching resistance of the resulting vulcanized rubber composition may be unsatisfactory and if it is too low, sometimes sufficient cross-linking effect cannot be obtained.

The ethylene copolymer rubber (A) of the present invention may contain, in addition to the above-mentioned monomers, other monomers copolymerizable therewith as constituting units. Such copolymerizable monomers include, for example, styrene and derivatives thereof, vinyl acetate, and halogenated olefins such as tetrafluoroethylene and hexafluoropropylene.

The ethylene copolymer rubber (A) is produced by known processes. For example, it can be produced by free-radical-initiated bulk polymerization, emulsion polymerization or solution polymerization. As a representative polymerization process, mention may be made of a process described in JP-B-46-45085, namely, by carrying out the polymerization under the conditions of a pressure of 500 kg/cm$^2$ or higher and a temperature in the range of 40° to 300° C. in the presence of a free-radical forming polymerization initiator.

As the ethylene copolymer rubber (A), there may be used copolymers having a melt index of normally 0.5–500 g/10 min, preferably 0.5–50 g/10 min at 190° C. specified in JIS K6791. If the melt index is too high, sometimes elasticity of the ethylene copolymer rubber is not sufficient and if it is too low, the rubber is sometimes inferior in processability.

Component (B) of the present invention is a hydrogenated unsaturated nitrile-conjugated diene copolymer rubber.

The unsaturated nitrile includes, for example, acrylonitrile and methacrylonitrile.

The conjugated diene includes, for example, 1,3-butadiene, isoprene, and 1,3-pentadiene. These may be used singly or in combination of two or more.

As examples of component (B), optional combinations of the unsaturated nitrile and the conjugated diene can be employed and besides, a part of the conjugated dienes can be replaced with unsaturated carboxylic acid esters such as methyl esters, butyl esters, and 2-ethylhexyl esters of acrylic acid, methacrylic acid, fumaric acid, and itaconic acid. Typical examples of component (B) are hydrogenated acrylonitrile-butadiene copolymer rubber, hydrogenated acrylonitrile-isoprene copolymer rubber, hydrogenated acrylonitrile-butadiene-isoprene copolymer rubber, hydrogenated acrylonitrile-butadiene-methyl acrylate copolymer rubber, and hydrogenated acrylonitrile-butadiene-butyl acrylate copolymer rubber.

Molar ratio of the unsaturated nitrile and the conjugated diene in the hydrogenated unsaturated nitrile-conjugated diene copolymer rubber (B) is usually (25–60):(75–40), preferably (35–55):(65–45). If proportion of the unsaturated nitrile is too high, the resulting vulcanized rubber composition is sometimes inferior in low-temperature resistance. If it is too low, the resulting vulcanized rubber composition is sometimes inferior in oil resistance.

The degree of hydrogenation of the conjugated diene unit portion of the hydrogenated unsaturated nitrile-conjugated diene copolymer rubber (B) is usually 50–98 mol %, preferably 70–98 mol %. With increase in the hydrogenation degree, heat resistance and ozone resistance of the resulting vulcanized rubber composition are improved and the improvements become the highest when hydrogenation degree is 100 mol %. However, in general the copolymer rubbers which are somewhat lower than 100 mol % in the hydrogenation degree are used taking into consideration the desired level of heat resistance and ozone resistance and the cost.

The hydrogenated unsaturated nitrile-conjugated diene copolymer rubber (B) can be obtained by hydrogenating the conjugated diene unit portion in unsaturated nitrile-conjugated diene copolymer rubbers produced by emulsion polymerization or solution polymerization by the processes disclosed in, for example, JP-B-45-39275 and JP-A-52-32095.

Proportion of ethylene copolymer rubber (A) and hydrogenated unsaturated nitrile-conjugated diene copolymer rubber (B) is not critical, but is usually (95–5):(5–95), preferably (70–30):(30–70) in weight ratio. If proportion of the ethylene copolymer rubber (A) is too high, the resulting vulcanized rubber composition is sometimes inferior in oil resistance. If it is too low, the resulting vulcanized rubber composition is sometimes inferior in ozone resistance and heat resistance.

The rubber composition of the present invention is used in the form of a vulcanizable rubber composition containing vulcanizing agent (C). As the vulcanizing agent (C), there may be used organic peroxides used for crosslinking of rubbers. Examples thereof are di-t-butyl peroxide, t-butylcumyl peroxide, dicumyl peroxide, $\alpha,\alpha$-bis(t-butylperoxyisopropyl)benzene, 2,5-dimethyl-2,5-di(t-butylperoxy)hexane, 2,5-dimethyl-2,5-di(t-butylperoxy)hexyne-3, 1,1-bis(t-butylperoxy)-3,3,5-trimethylcyclohexane, n-butyl-4,4-bis(t-butylperoxy) valerate, 2,2-bis(t-butylperoxy)butane, and 2,2-bis(t-butylperoxy)octane.

Content of vulcanizing agent (C) is preferably in the range of 1 to 10 parts by weight, more preferably in the range of 2 to 6 parts by weight per totally 100 parts by weight of ethylene copolymer rubber (A) and hydrogenated unsaturated nitrile-conjugated diene copolymer rubber (B). If content of vulcanizing agent (C) is too high, problems such as blowing occur in vulcanization molding and if it is too low, crosslinking density is low and mechanical strength of vulcanized rubber composition is sometimes insufficient.

The rubber composition of the present invention is mixed with the above-mentioned vulcanizing agent and reinforcing agents, fillers, plasticizers, aging inhibitors, stabilizers, processing aids, etc. which are normally used in rubber industries by usual kneading machines such as roll and Banbury mixer, thereby to prepare a vulcanizable rubber composition. The composition is molded into various shapes depending on its use. Vulcanization is carried out usually at about 120° C. or higher, preferably at about 150° to 220° C. for about 1 to 30 minutes.

The present invention will be explained in detail by the following examples.

EXAMPLES 1–3 AND COMPARATIVE EXAMPLES 1–2

Ethylene copolymer rubber and hydrogenated acrylonitrile-butadiene copolymer rubber (hereinafter sometimes referred to as "hydrogenated NBR") as hydrogenated unsaturated nitrile-conjugated diene copolymer rubber which are shown in the column of Rubber component in Table 1, 40 parts by weight of FEF black, 1 part by weight of stearic acid, 0.5 part by weight of ARMEEN 18D (a processing aid manufactured by Lion-Akzo Co.), 2 parts by weight of NAUGUARD 44 (an aging inhibitor manufactured by Uniroyal Chemical Co.), 3.5 parts by weight of 98% dicumyl peroxide (an organic peroxide manufactured by Sanken Kako Co.), and 1.0 part by weight of TAIC (a processing sid manufactured by Nippon Kasei Co.) were kneaded by a 6 inch open roll at 50° to 60° C. for 15 to 20 minutes to obtain a blend. This was press vulcanized at 170° C. for 20 minutes. Properties of the resulting vulcanized rubber compositions were measured in accordance with JIS K6301. The results are shown in Table 1.

EXAMPLES 4-7 AND COMPARATIVE EXAMPLES 3-5

Example 1 was repeated except that hydrogenated NBR differing in acrylonitrile/butadiene contents and hydrogenation degree were used. The conditions and the results are shown in Table 2.

EXAMPLES 8-11 AND COMPARATIVE EXAMPLES 6-8

Example 1 was repeated except that ethylene copolymer rubbers different in ethylene/methyl acrylate contents from that in Example 1 were used. The conditions and the results are shown in Table 3.

EXAMPLES 12-16 AND COMPARATIVE EXAMPLES 9-12

Example 1 was repeated except that ethylene copolymer rubbers which comprised ethylene, methyl acrylate and besides other monomers were used and a vulcanizing agent different from that in Example 1 was used in some cases. The conditions and the results are shown in Table 4-1 and Table 4-2.

TABLE 1

|  |  | Example 1 | Example 2 | Example 3 | Comparative Example 1 | Comparative Example 2 |
|---|---|---|---|---|---|---|
| Rubber component (part by weight) | | | | | | |
| (A) | Ethylene copolymer rubber*1 Type-1 | 70 | 50 | 30 | 100 | — |
| (B) | Hydrogenated NBR*2 Zetpol 2010 | 30 | 50 | 70 | — | 100 |
| Evaluation of valcanized rubber | | | | | | |
| Tensile properties | | | | | | |
| Tensile strength Kgf/cm$^2$ | | 151 | 192 | 223 | 141 | 261 |
| Elongation % | | 280 | 310 | 350 | 350 | 420 |
| Hardness JIS-A | | 62 | 63 | 63 | 55 | 65 |
| Heat resistance*3 | | | | | | |
| Change in tensile strength % | | −3 | −10 | −23 | −16 | −23 |
| Change in elongation % | | −46 | −65 | −71 | +26 | −74 |
| Change in hardness Point | | +20 | +18 | +17 | +8 | +16 |
| Oil resistance*4 | | | | | | |
| Volume swell % | | +52 | +42 | +34 | +70 | +23 |
| Low-temperature resistance (Gehman torsional test) | | | | | | |
| T$_2$ °C. | | −17 | −9 | −19 | −7 | −20 |
| T$_5$ °C. | | −28 | −25 | −27 | −26 | −25 |
| T$_{10}$ °C. | | −30 | −28 | −29 | −31 | −27 |
| T$_{100}$ °C. | | −38 | −35 | −35 | −37 | −33 |
| Freezing temperature °C. | | −40 | −36 | −35 | −40 | −34 |

TABLE 2

|  |  | Example 4 | Example 5 | Example 6 | Example 7 | Comparative Example 3 | Comparative Example 4 | Comparative Example 5 |
|---|---|---|---|---|---|---|---|---|
| Rubber components (part by weight) | | | | | | | | |
| (A) | Ethylene copolymer rubber*1 Type-1 | 70 | 30 | 70 | 30 | 100 | — | — |
| (B) | Hydrogenated NBR*2 | | | | | | | |
|  | Zetpol 1020 | 30 | 70 | — | — | — | 100 | — |
|  | Zetpol 2020 | — | — | 30 | 70 | — | — | 100 |
| Evaluation of valcanized rubber | | | | | | | | |
| Tensile properties | | | | | | | | |
| Tensile strength Kgf/cm$^2$ | | 150 | 218 | 150 | 215 | 141 | 275 | 254 |
| Elongation % | | 260 | 290 | 230 | 290 | 350 | 360 | 340 |
| Hardness JIS-A | | 64 | 67 | 63 | 65 | 55 | 69 | 68 |
| Heat Resistance*5 | | | | | | | | |
| Change in tensile strength % | | −9 | −42 | −1 | −44 | −16 | −56 | −57 |
| Change in elongation % | | −62 | −57 | −42 | −50 | +26 | −83 | −82 |
| Change in hardness Point | | +23 | +17 | +20 | +16 | +8 | +13 | +12 |
| Oil resistance*4 | | | | | | | | |
| Volume swell % | | +48 | +25 | +51 | +33 | +70 | +10 | +22 |
| Low-temperature resistance (Gehman torsional test) | | | | | | | | |
| T$_2$ °C. | | −11 | −10 | −17 | −21 | −7 | −14 | −22 |
| T$_{100}$ °C. | | −35 | −26 | −37 | −35 | −37 | −27 | −34 |
| Ozone resistance (Generation of cracks)*6 | | | | | | | | |
| 48 hr | | No | No | No | No | No | No | B-2 |
| 96 hr | | No | No | No | No | No | B-2 | B-3 |

TABLE 3

|  |  | Example 8 | Example 9 | Example 10 | Example 11 | Comparative Example 6 | Comparative Example 7 | Comparative Example 8 |
|---|---|---|---|---|---|---|---|---|
| Rubber components (part by weight) | | | | | | | | |
| (A) | Ethylene copolymer rubber*1 | | | | | | | |

TABLE 3-continued

|  |  | Example | | | | Comparative Example | | |
|---|---|---|---|---|---|---|---|---|
|  |  | 8 | 9 | 10 | 11 | 6 | 7 | 8 |
|  | Type-2 | 70 | 30 | — | — | 100 | — | — |
|  | Type-3 | — | — | 70 | 30 | — | 100 | — |
| (B) | Hydrogenated NBR*2 | | | | | | | |
|  | Zetpol 2020 | 30 | 70 | 30 | 70 | — | — | 100 |
| Evaluation of vulcanized rubber | | | | | | | | |
| Tensile properties | | | | | | | | |
| Tensile strength kgf/cm$^2$ | | 152 | 194 | 140 | 191 | 149 | 141 | 254 |
| Elongation % | | 230 | 260 | 220 | 260 | 330 | 350 | 340 |
| Hardness JIS-A | | 63 | 66 | 64 | 65 | 56 | 56 | 68 |
| Heat resistance*5 | | | | | | | | |
| Change in tensile strength % | | −14 | −47 | −10 | −44 | −21 | −24 | −57 |
| Change in elongation % | | −61 | −77 | −59 | −77 | +21 | +20 | −82 |
| Change in hardness Point | | +20 | +14 | +21 | +16 | +5 | +6 | +12 |
| Oil resistance*4 | | | | | | | | |
| Volume swell % | | +58 | +37 | +47 | +33 | +83 | +59 | +22 |
| Low-temperature resistance (Gehman torsional test) | | | | | | | | |
| $T_2$ °C. | | −18 | −22 | −16 | −19 | −10 | +5 | −22 |
| $T_{100}$ °C. | | −38 | −35 | −36 | −34 | −39 | −32 | −34 |
| Ozone resistance (Generation of cracks)*6 | | | | | | | | |
| 48 hr | | No | No | No | No | No | No | B-2 |
| 96 hr | | No | No | No | No | No | No | B-3 |

TABLE 4-1

|  |  | Example | | | | |
|---|---|---|---|---|---|---|
|  |  | 12 | 13 | 14 | 15 | 16 |
| Rubber components (part by weight) | | | | | | |
| (A) | Ethylene copolymer rubber*1 | | | | | |
|  | Type-4 | 70 | 30 | — | — | — |
|  | Type-5 | — | — | 70 | 30 | — |
|  | Type-1 | — | — | — | — | 50 |
| (B) | Hydrogenated NBR*2 | | | | | |
|  | Zetpol 2020 | 30 | 70 | 30 | 70 | 50 |
| Evaluation of vulcanized rubber | | | | | | |
| Tensile properties | | | | | | |
| Tensile strength Kgf/cm$^2$ | | 154 | 210 | 146 | 197 | 110 |
| Elongation % | | 240 | 270 | 250 | 270 | 500 |
| Hardness JIS-A | | 64 | 65 | 63 | 65 | 58 |
| Heat resistance*5 | | | | | | |
| Change in tensile strength % | | −5 | −46 | −9 | −43 | 0 |
| Change in elongation % | | −42 | −65 | −64 | −78 | −84 |
| Change in hardness Point | | +20 | +16 | +20 | +16 | +21 |
| Oil resistance*4 | | | | | | |
| Volume swell % | | +50 | +33 | +52 | +34 | +57 |
| Low-temperature resistance (Gehman torsional test) | | | | | | |
| $T_2$ °C. | | −12 | −18 | −12 | −17 | −12 |
| $T_{100}$ °C. | | −36 | −34 | −36 | −34 | −36 |
| Ozone resistance (Generation of cracks)*6 | | | | | | |
| 48 hr | | No | No | No | No | No |
| 96 hr | | No | No | No | No | No |

TABLE 4-2

|  |  | Comparative Example | | | |
|---|---|---|---|---|---|
|  |  | 9 | 10 | 11 | 12 |
| Rubber components (part by weight) | | | | | |
| (A) | Ethylene copolymer rubber*1 | | | | |
|  | Type-4 | 100 | — | — | — |
|  | Type-5 | — | 100 | — | — |
|  | Type-1 | — | — | 100 | — |
| (B) | Hydroganated NBR*2 | | | | |
|  | Zetpol 2020 | — | — | — | 100 |
| Evaluation of vulcanized rubber | | | | | |
| Tensile properties | | | | | |
| Tensile strength Kgf/cm$^2$ | | 142 | 135 | 52 | 254 |
| Elongation % | | 300 | 420 | 770 | 340 |
| Hardness JIS-A | | 57 | 56 | 47 | 68 |
| Heat resistance*5 | | | | | |
| Change in tensile strength % | | −1 | −32 | −40 | −57 |
| Change in elongation % | | −57 | +17 | −22 | −82 |
| Change in hardness Point | | +15 | +2 | +6 | +12 |
| Oil resistance*4 | | | | | |
| Volume swell % | | +63 | +69 | +100 | +22 |
| Low-temperature resistance (Gehman torsional test) | | | | | |
| $T_2$ °C. | | −10 | −6 | −6 | −22 |
| $T_{100}$ °C. | | −37 | −35 | −35 | −34 |
| Ozone resistance (Generation of cracks)*6 | | | | | |
| 48 hr | | No | No | No | B-2 |

TABLE 4-2-continued

| 96 hr | No | No | No | B-3 |

In Comparative Example 11, di-t-butyl-peroxy-3,3,5-trimethylcyclohexane was used as an organic peroxide.
*1: Ethylene copolymer rubbers
Type-1: Ethylene 68 mol %, methyl acrylate 32 mol %
Type-2: Ethylene 73 mol %, methyl acrylate 27 mol %
Type-3: Ethylene 56 mol %, methyl acrylate 44 mol %
Type-4: Ethylene 67 mol %, methyl acrylate 32 mol %, glycidyl methacrylate 1 mol %
Type-5: VAMAC G manufactured by DuPont de Nemours, E. I., Co. [ethylene (41 mol %) − methyl acrylate (54 mol %) − carboxyl-group containing monomer (5 mol %) copolymer rubber]
*2: Hydrogenated NBR
Zetpol 2010: manufactured by Nippon Zeon Co., Ltd.; acrylonitrile:butadiene molar ratio = 37:63; hydrogenation degree: 95 mol %
Zetpol 1020: manufactured by Nippon Zeon Co., Ltd.; acrylonitrile:butadiene molar ratio = 45:55; hydrogenation degree: 90 mol %
Zetpol 2020: manufactured by Nippon Zeon Co., Ltd.; acrylonitrile:butadiene molar ratio = 37:63; hydrogenation degree: 90 mol %
*3: Aging test by heating in the air: 175° C. × 7 days
*4: JIS No. 3 oil: 150° C. × 70 hours
*5: Aging test by heating in the air: 185° C. × 3 days
*6: Static test: Stretching 20 % at 60° C. and 50 pphm $O_3$ The compositions in all of the above Examples were satisfactory in all properties of tensile properties, heat resistance, oil resistance and low-temperature resistance and it can be seen that vulcanized rubber compositions well-balanced in properties were obtained. On the other hand, in Comparative Examples, compositions which did not contain component (A) of the present invention were inferior in heat resistance and those which did not contain component (B) of the present invention were inferior in tensile properties and oil resistance and all of them lacked balance of properties.

As explained above, according to the present invention, it has become possible to provide a rubber composition which can be made to a vulcanized rubber composition having well-balanced strength characteristics, oil resistance, low-temperature resistance, heat resistance and ozone resistance with maintaining the characteristics of rubbers.

We claim:

1. A rubber composition which comprises:
(A) an ethylene copolymer rubber comprising ethylene and (i) at least one compound selected from the group consisting of acrylates and methacrylates, or (ii) at least one member selected from the group consisting of acrylates and methacrylates, and an epoxy group-containing compound, wherein the molar ratio of the at least one member selected from the group consisting of acrylates and methacrylates to ethylene in component (A) is 50-15:50-85,
(B) a hydrogenated unsaturated nitrile-conjugated diene copolymer rubber, and
(C) a vulcanizing agent comprising an organic peroxide.

2. A rubber composition which comprises:
(A) an ethylene copolymer rubber consisting of (i) ethylene and (ii) at least one compound selected from the group consisting of acrylic esters and methacrylic esters, or (b) an ethylene copolymer rubber consisting of (i) ethylene (ii) at least one member selected from the group consisting of acrylic esters and methacrylic esters, and (iii) a cross-linkable third compound which is an epoxy group-containing monomer, where the molar ratio of the at least one compound selected from the group consisting of acrylic esters and methacrylic esters to ethylene in component (a) is 50-15:50-85,
(B) a hydrogenated unsaturated nitrile-conjugated diene copolymer rubber, and
(C) a vulcanizing agent consisting of an organic peroxide.

3. A rubber composition according to claim 1 or 2, wherein the acrylates and methacrylates of component (A) are esters of alcohols having 1 to 8 carbon atoms.

4. A rubber composition according to claim 1 or 2, wherein the content of the epoxy group-containing compound is in the range of 0.05 to 5 mol % based on total amount of ethylene, acrylates ad methacrylates.

5. A rubber composition according to claim 1 or 2, wherein component (A) has a melt index specified in JIS K6791 of 0.5-500 g/10 min at 190° C.

6. A rubber composition according to claim 1 or 2, wherein component (A) has a melt index specified in JIS K6791 of 0.5-50 g/10 min at 190° C.

7. A rubber composition according to claim 1 or 2, wherein the nitrile in component (B) is acrylonitrile or methacrylonitrile.

8. A rubber composition according to claim 1 or 2, wherein the conjugated diene in component (B) is 1,3-butadiene, isoprene or 1,3-pentadiene.

9. A rubber composition according to claim 1 or 2, wherein molar ratio of the unsaturated nitrile and the conjugated diene in component (B) is 25-60:75-40.

10. A rubber composition according to claim 1 or 2, wherein molar ratio of the unsaturated nitrile and the conjugated diene in component (B) is 35-55:65-45.

11. A rubber composition according to claim 1 or 2, wherein hydrogenation degree of the hydrogenated unsaturated nitrile in component (B) is in the range of 50 to 98 mol %.

12. A rubber composition according to claim 1 or 2, wherein hydrogenation degree of the hydrogenated unsaturated nitrile in component (B) is in the range of 70 to 98 mol %.

13. A rubber composition according to claim 1 or 2, wherein weight ratio of component (A) and component is 95-5:5-95.

14. A rubber composition according to claim 1 or 2, wherein weight ratio of component (A) and component (B) is 70-30:30-70.

15. A rubber composition according to claim 1 or 2, wherein component (C) is present in the range of 1 to 10 parts by weight based on totally 100 parts by weight of component (A) and component (B).

16. A rubber composition according to claim 1 or 2, wherein component (C) is present in the range of 2 to 6 parts by weight based on totally 100 parts by weight of component (A) and component (B).

* * * * *